S. W. BARR.
Velocipede.
No. 30,192. Patented Oct. 2, 1860.
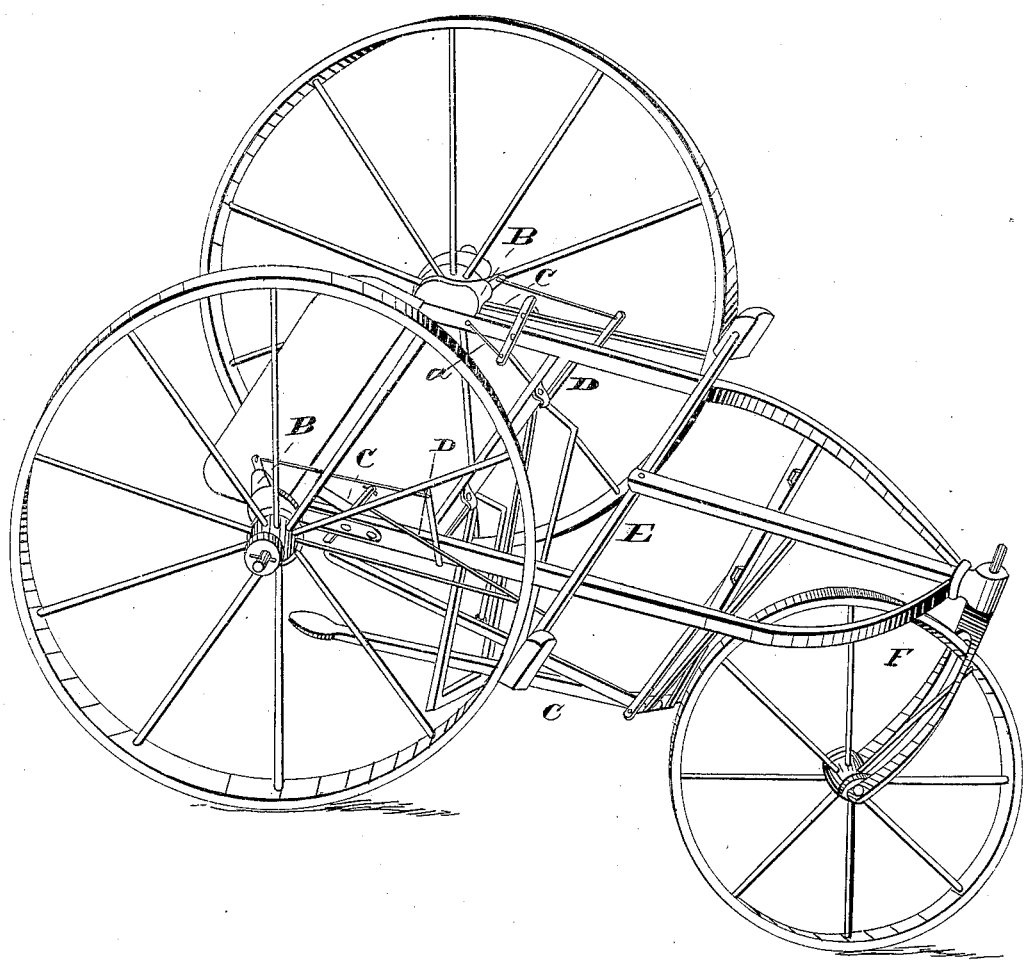
Witnesses.
Jas. H. Merrin
E. J. Hudson
Inventor:
Samuel W. Barr.

UNITED STATES PATENT OFFICE.

SAMUEL W. BARR, OF MANSFIELD, OHIO.

IMPROVEMENT IN VELOCIPEDE VEHICLES.

Specification forming part of Letters Patent No. 30,192, dated October 2, 1860.

*To all whom it may concern:*

Be it known that I, SAMUEL W. BARR, of Mansfield, in the county of Richland and State of Ohio, have invented a new and Improved Mode of Propelling and Guiding a Three-Wheeled Wagon, through which it is rendered truly serviceable; and I do hereby declare that the following is a true and exact description of the construction and operation of the same, reference being had to the accompanying drawings and letters marked thereon.

The drawings represent a wagon of three wheels, made of good material, and just heavy enough to carry the person that uses it.

It is important to dispense with all unnecessary weight, as every pound offers some resistance to the propelling-power. The hind wheels are made high and light, the front wheel one-third the height of the hind wheels and light also.

The wagon is made much narrower than a common carriage. The axle, either wood or iron, is turned, as seen at $h$, additional drawing, and has a common spindle at each end. A light ratchet-wheel, (represented at $j$,) with a square hole in its center and two others near its circumference at opposite points, is made fast on each shoulder of the axle next the spindle. The ratchet-wheel for a large-sized wagon is about six inches in diameter by one and one-fourth thick and varies according to the size of wagon. Through each of the holes, near its circumference, a small key is shown at $p$, with the end crooked, so as to reach the axle, and a notch cut in the end that slides upon the axle between the ratchet-wheel and shaft that runs forward to front wheel moves back and forth by means of the ring shown at $v$.

The additional drawing represents at $k$ a flat casting made about half an inch greater in diameter than the ratchet-wheel, with a circle of holes exactly corresponding to those in the latter. This casting is screwed fast on the butt-end of the hub, as shown at $k$, on the wheel, and works close to the ratchet-wheel, so as to admit the points of the keys all around.

At $b$ is represented the band, somewhat the shape of a stirrup, with its catch-lever, and at $h$ is seen the axle, with its ratchet-wheels, keys, rings, and bands all in their proper places and ready for the wheel with its casting $k$. A wheel cut out of sheet-iron, the same in diameter as the casting $k$, is fixed on the axle inside of each ratchet-wheel, as shown at $h$, to prevent the band $b$ from slipping off.

The wheels have no play on the spindles, except what is necessary to allow them to revolve. They work close against the ratchet-wheels, and the points of these keys slipping through the holes in casting on the hub lock the wheels to the axle. These keys are worked by rings made large enough to encircle the axle and move freely upon it. These rings play in notches cut in the ends of the keys, by which it draws them out or shoves them to and when shoved to the wheels and axle revolve together. To each of these rings is welded a strip of spring-steel, which extends forward, as seen at O, and is screwed fast to the shaft running to the front wheel. The spring allows the ring to range over a distance of about two inches. A space of two inches intervenes between the shaft and ratchet-wheel on each side of the frame.

$b\ b$ are two bands encircling the ratchet-wheels and bent out at one point so as to form the fulcrum of a catch-lever. The band with its lever works freely on the ratchet-wheel, and whenever thrown back it catches and thus forms a kind of crank upon the axle.

$a$ is a strap of leather fastened with one end to the spring $o$, and, running through the shafts, is fastened at the other to the lower ends of the holds or hand-levers $c\ c$.

The wagon is guided by the hind wheels exclusively. The person that runs it stands upon the treadles $g$, with his feet buckled fast. He takes the holds $c\ c$ in his hands, and when he wishes to turn to the right he draws the right hold back and breaks the connection on the right side between the wheel and axle, and the left wheel is whirled around to the right, the propelling-power being exerted on the axle at all times, and the connection being closed on the right and broken on the left, the wagon will turn to the left. The front wheel turns by means of the bent fork F, entirely subject to the hind wheels. $d\ d$ are short axles with cranks or elbows at their ends. On two of these cranks rods are hooked, which run back to the catch-levers working in $b\ b$. On the other two cranks rods are fastened that run to the treadles $g$, and, being made fast about the middle of the treadles, a man of one hundred and fifty pounds on the end of the treadle gives a power of three hundred pounds, and, in addition to this, he has double the weight he can raise when standing erect and lifting at the holds $c\ c$. By means of catch-levers working on wheels on the axle we have the full advantage of the propelling-power at any point in the revolution of the hind wheels, and can run it up hill or on the level with considerable speed. E is a small piece of timber on which the rubbers are fastened by which the wagon is guided when going downhill.

The peculiar mode which I have invented of guiding three-wheeled wagons by means of a part of the machinery already described brings them perfectly under control, as they can be turned to the right or left in a circle, leaving the inside wheel on one spot. Also, when running, the wheels and axle being connected, they are obliged to run straight forward, as one wheel cannot revolve faster than the other. The mode of getting the propelling-power has a decided advantage over all others, also, for a man standing erect upon the treadles and throwing his weight alternately upon one and then the other can exert more force with greater ease than in any other way. The ratchet-wheel, too, with its band $b$ and catch-lever, is far superior to a crank in the axle, as with a crank formed upon the axle by the machinery just mentioned we can have the full leverage of this peculiar crank at any moment, and hence the wagon can be run uphill and over bad roads without getting off.

I claim—

In my improvement in three-wheeled wagons, the peculiar arrangement of the spring-clutch $o$, hand-levers $c\ c$, and break-arms $e$, in combination with the devices for applying the motive power and guiding the wagon, as described, and for the purpose set forth.

SAMUEL W. BARR.

Witnesses:
  JOHN A. ROBERTS,
  GEORGE ARMENTROUT.